May 6, 1930.  J. B. STRAUSS  1,757,751
PRISON DOOR OPERATOR
Filed May 7, 1925   2 Sheets-Sheet 2

Inventor:
Joseph B. Strauss
By Parker & Carter Attys

Patented May 6, 1930

1,757,751

UNITED STATES PATENT OFFICE

JOSEPH B. STRAUSS, OF CHICAGO, ILLINOIS

PRISON-DOOR OPERATOR

Application filed May 7, 1925. Serial No. 28,630.

This invention relates to prison doors, and has for its object to provide a new and improved device of this description.

The invention has as a further object to provide a strong, durable door which can at the same time be easily and quickly controlled.

The invention has further objects which are more particularly set forth in the following description.

Referring to the drawings.

Like numerals refer to like parts throughout the several figures.

Figure 1:
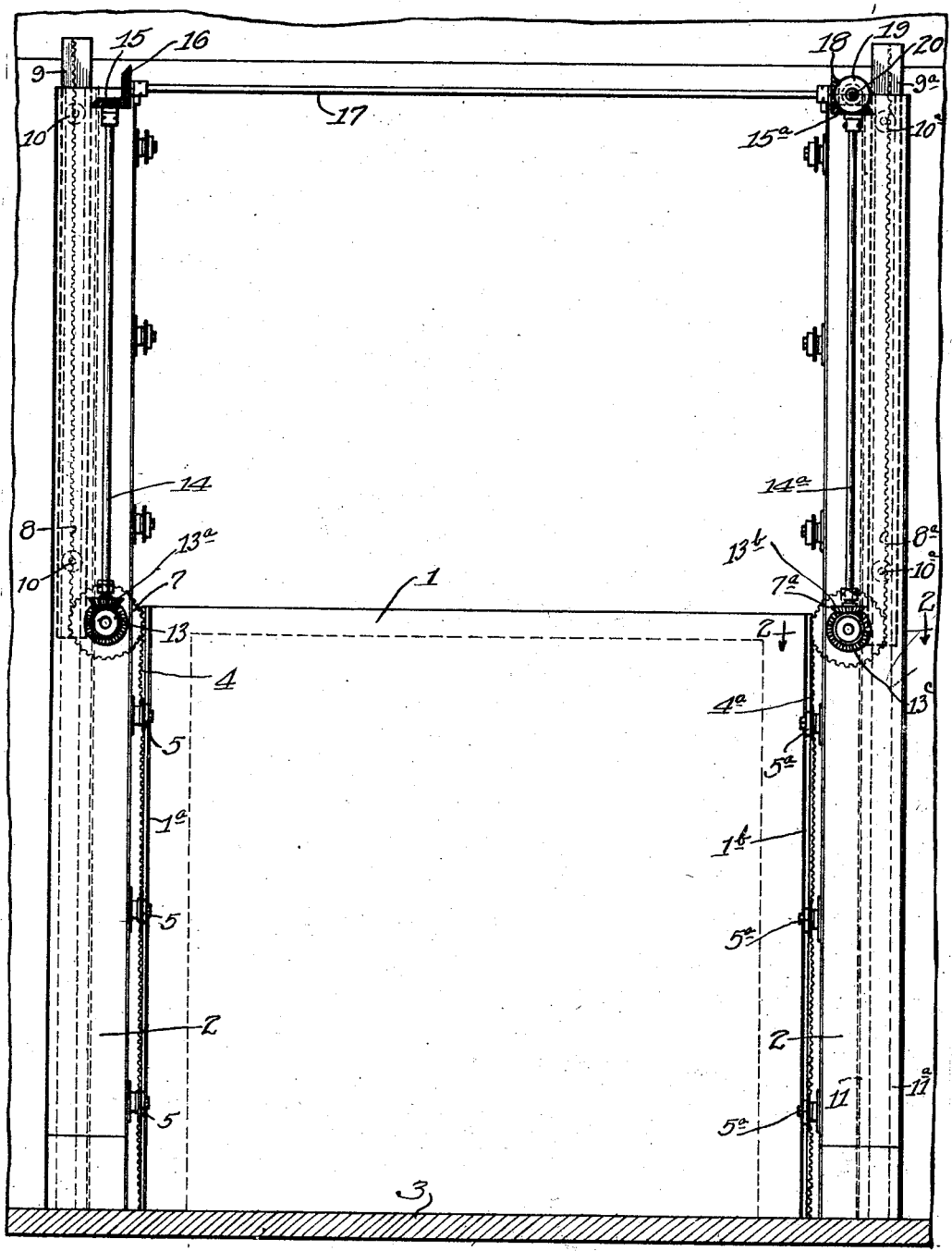
Fig. 1 is a front elevation showing one form of device embodying the invention.
Figure 2:
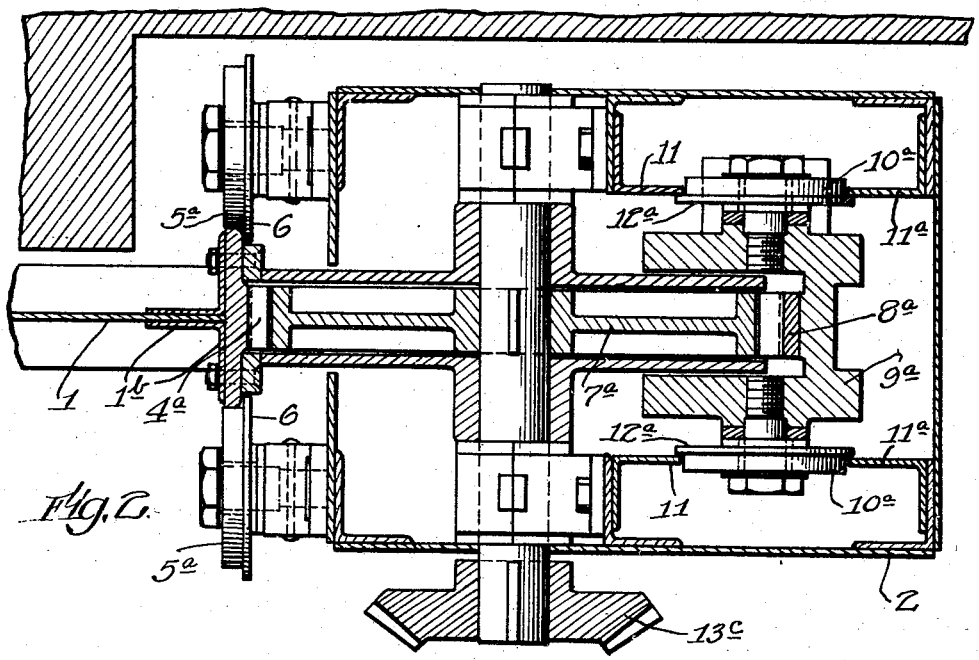
Fig. 2 is an enlarged sectional view taken on line 2—2 of Fig. 1.
Figure 3:
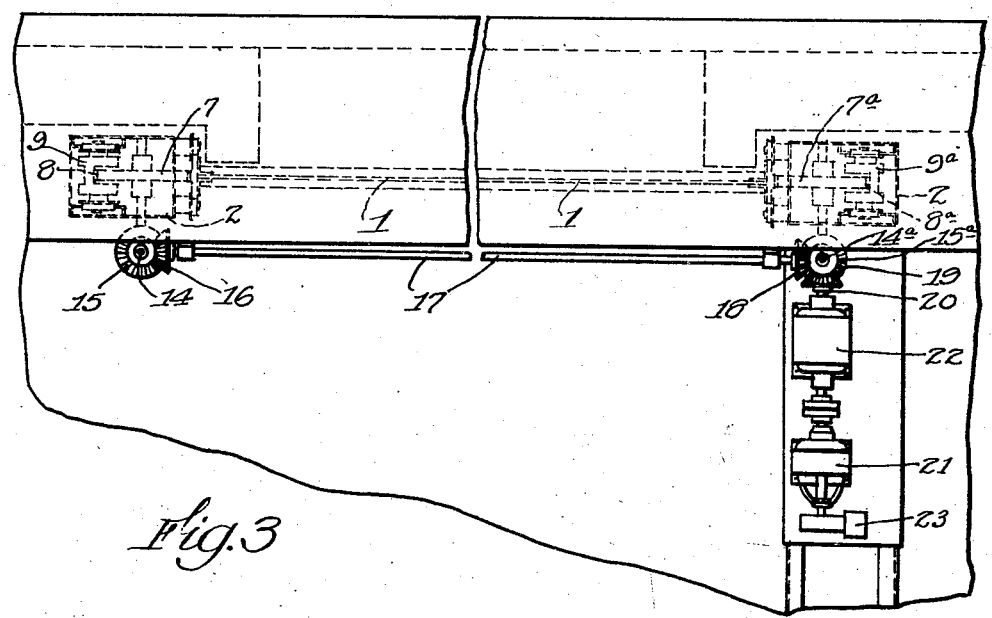
Fig. 3 is a plan view of one of the doors showing the operating mechanism.

Referring now to Figs. 1 and 2, I have shown a closing part 1 which moves along the frame or frame pieces 2; the frame is preferably of metal and is anchored to the masonry 3. The closing part 1 is provided at its edges with the racks 4 and 4$^a$, the frame is provided with guide rollers 5 and 5$^a$ which engage opposite sides of the edge of the closing part, as shown in Fig. 2, along which the closing part rolls as it is lifted and lowered.

This closing part has at its edges the laterally projecting members 1$^a$ and 1$^b$, the racks 4 and 4$^a$ being connected to these members 1$^a$ and 1$^b$. The rollers 5 and 5$^a$ engage the edges of the racks 4 and 4$^a$ and have flanges 6, which project along the face of the parts 4 and 4$^a$, so as to prevent disengagement of the rollers with the door. Some suitable means is provided for counterweighting the closing part 1. In the construction shown, the racks 4 and 4$^a$ engage the rack wheels 7 and 7$^a$ at opposite sides of the opening. These rack wheels 7 and 7$^a$ are also engaged by the counterweight racks 8 and 8$^a$. The counterweight racks have counterweights 9 and 9$^a$ attached thereto, said counterweights preferably being provided with grooves, into which portions of the gears 7 and 7$^a$ are received (see Fig. 2). The counterweights are provided with guide rollers 10 and 10$^a$, which engage guides 11$^a$. These guides are preferably formed by parts of the frame pieces 2 which are hollow and provided with slots along one side into which the guide rollers project, said guide rollers being provided with flanges 12$^a$, which engage the faces of the guides 11 and 11$^a$. The gear 7 has connected therewith a bevel gear 13, which engages a bevel gear 13$^a$ and is connected to a shaft 14 extending along the frame piece 2, said shaft having at the other end a bevel gear 15, which engages a bevel gear 16 on a shaft 17 which extends crosswise above the closing part 1. This shaft has at its end a bevel gear 18 which engages a bevel gear 19. These two bevel gears engage a bevel gear 15$^a$ on the shaft 14$^a$, said latter shaft being provided with a bevel gear 13$^b$ which engages a bevel gear 13$^c$ connected with the rack wheel 7$^a$. The bevel gear 19 is connected with a driving shaft 20 driven from some suitable source of power; as for example the electric motor 21. There is a speed reducing device 22 interposed between the motor and the shaft 20 so as to secure the proper speed of rotation for the bevel gear 19 and the parts driven therefrom which lift and lower the door. The motor is also preferably provided with a brake 23. A switch for controlling the motor may be located at any desired point. The mechanism shown is such that the door will be locked in its closed position. An additional locking means may be used if desired.

The use and operation of my invention are as follows:

When the door is closed and it is desired to open it the switch controlling the motor 21 is closed so as to set said motor in operation. This motor, through the speed reducing device 22, rotates the bevel gear 19. This causes the bevel gear 15$^a$ to rotate thereby rotating the shaft 14$^a$ and bevel gear 13$^b$, which by its engagement with bevel gear 13$^c$ rotates the rack wheel 7$^a$. At the same time the rack wheel 7 is rotated by the bevel gear 18, shaft 17, bevel gears 16 and 15, shaft 14 and bevel gears 13$^a$ and 13. The rotation of the rack wheels 7 and 7$^a$ by engagement with the racks on the closing device and the counterweights causes the closing device or door to be lifted and the counterweights to be lowered. When the door is lifted to the proper height the motor is stopped. When it is desired to lower the door the motor is reversed and this, through the parts hereinbefore described causes the door to be lowered and the counterweights to be raised. The brake 23 acts also when in operation to lock the parts in any desired position.

It will thus be seen that I have here a strong, durable, easily operated and efficient door or closing device for prisons.

I claim:

1. A prison door comprising a frame, a closing part adapted to slide along said frame, a motor located above said closing part, a vertical shaft at each side of said frame, a horizontal shaft connecting them, all of said shafts being connected with said motor, a driving connection between said vertical shafts and two sides of said closing part, whereby the closing part may be reciprocated along said frame.

2. A prison door comprising a closing part adapted to be lifted and lowered, a pair of toothed racks on the sides of said closing part, a pinion associated with each rack, a toothed counterweight located at one side of the closing part and in a vertical plane extending through said closing part associated with the pinion and means for rotating the pinion to raise and lower the closing part.

3. A prison door comprising a closing part adapted to be lifted and lowered, a pair of toothed racks on the sides of said closing part, a pinion associated with each rack, a toothed counterweight located at one side of the closing part and in a vertical plane extending through said closing part associated with the pinion and means for rotating the pinion to raise and lower the closing part, said means comprising operating mechanism associated with the pinion.

4. A prison door comprising a metal frame, a closing part associated therewith, toothed racks at the sides thereof, a pinion in the plane of the closing part and engaging said racks, a counterweight located at one side of the closing part and in a vertical plane extending through said closing part, a rack in said counterweight engaging said pinion and means for operating the parts to raise and lower the closing part.

5. A prison door comprising a central frame, a facing on either side of said central frame, toothed racks at the sides thereof, a closing part, pinions in the plane of the closing part and engaging said racks, a recessed counterweight on each side of said closing part, a rack in said counterweight engaging in the recess of each pinion and means for operating the parts to raise and lower the closing part.

6. A lifting mechanism comprising a pinion, a pair of toothed racks engaging therewith, a part to be lifted connected to one of said racks, a counterweight connected to the other rack, said counterweight being channel shaped and partly enclosing said pinion.

7. A lifting mechanism comprising a pinion, a pair of toothed racks engaging therewith, a part to be lifted connected to one of said racks, a counterweight connected to the other rack, said counterweight having a recess, the rack located within said recess.

8. A prison door comprising a closing part, adapted to be lifted and lowered, a toothed rack on each side of said closing part, a pinion associated with each rack, a toothed counterweight associated with the pinion and means for rotating the pinion to raise and lower the closing part, said means comprising operating mechanism associated with the pinion, and guiding devices for said closing part and counterweight comprising rollers, the axes of the rollers for the counterweight being at right angles to the axes of the rollers of the closing part.

Signed at Chicago, county of Cook, and State of Illinois, this 1st day of May, 1925.

JOSEPH B. STRAUSS.